(12) United States Patent
Watanabe et al.

(10) Patent No.: US 9,198,253 B2
(45) Date of Patent: Nov. 24, 2015

(54) SEMICONDUCTOR LIGHTING APPARATUS

(71) Applicant: MITSUBISHI ELECTRIC CORPORATION, Tokyo (JP)

(72) Inventors: Hiroyuki Watanabe, Tokyo (JP); Makoto Kuriaki, Tokyo (JP); Tetsuya Nishimura, Tokyo (JP); Yasuhito Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 305 days.

(21) Appl. No.: 13/887,897

(22) Filed: May 6, 2013

(65) Prior Publication Data

US 2013/0334965 A1    Dec. 19, 2013

(30) Foreign Application Priority Data

Jun. 14, 2012    (JP) .................................. 2012-134682

(51) Int. Cl.
| | | |
|---|---|---|
| *H01J 7/24* | (2006.01) | |
| *H05B 33/08* | (2006.01) | |
| *G03B 21/16* | (2006.01) | |
| *G03B 21/20* | (2006.01) | |
| *H04N 9/31* | (2006.01) | |

(52) U.S. Cl.
CPC ............ *H05B 33/0872* (2013.01); *G03B 21/16* (2013.01); *G03B 21/2033* (2013.01); *G03B 21/2053* (2013.01); *H04N 9/3155* (2013.01); *H04N 9/3161* (2013.01); *H04N 9/3194* (2013.01)

(58) Field of Classification Search
CPC ........... H05B 33/0872; H05B 33/0869; G03B 21/2033; G03B 21/2053; H01J 7/24
USPC ......................................................... 315/113
See application file for complete search history.

(56) References Cited

U.S. PATENT DOCUMENTS

| | | | |
|---|---|---|---|
| 7,795,822 B2 * | 9/2010 | Arai et al. ..................... 315/309 |
| 2008/0042578 A1 | 2/2008 | Arai et al. | |
| 2009/0206236 A1 | 8/2009 | Kawashima et al. | |

FOREIGN PATENT DOCUMENTS

| | | |
|---|---|---|
| CN | 101071259 A | 11/2007 |
| CN | 101769448 A | 7/2010 |
| CN | 102014565 A | 4/2011 |
| JP | 4525767 B2 | 8/2010 |
| WO | WO 2011/086682 A1 | 7/2011 |

* cited by examiner

*Primary Examiner* — Hai L Nguyen
(74) *Attorney, Agent, or Firm* — Birch, Stewart, Kolasch & Birch, LLP

(57) ABSTRACT

A semiconductor lighting apparatus includes a plurality of semiconductor light emitting devices for outputting light having respective colors, a projector for synthesizing output light of the semiconductor light emitting devices and outputting synthesized light, and a calculating portion. The calculating portion controls a driving current to be supplied to the semiconductor light emitting devices in such a manner that a light quantity detected by optical sensors approximates to a predetermined target light quantity, and calculates a target temperature of the semiconductor light emitting devices to control temperature regulating portions in such a manner that a temperature detected by temperature sensors approximates to the target temperature.

4 Claims, 2 Drawing Sheets

SEMICONDUCTOR LIGHTING APPARATUS

BACKGROUND OF THE INVENTION

1. Field of the Invention

The present invention relates to a semiconductor lighting apparatus using a plurality of semiconductor light emitting devices, particularly to a technique for maintaining a luminance and a chromaticity to be constant.

2. Description of the Background Art

A semiconductor light emitting device such as a semiconductor laser (a laser diode: LD) or a light emitting diode (LED) is used in place of a lamp as a light source of an illuminating device or a display device. For uses of this type, there is utilized a light emitting device corresponding to three colors of red, green, and blue colors which are so-called three primary colors of light. By controlling a rate of quantities of the light having the respective colors to be a constant ratio and adding them together, white light is obtained by synthesis. In order to implement excellent color reproducibility, it is necessary to maintain the rate of the quantities of the light having the respective colors to be constant and to hold respective wavelengths of the light having the respective colors to be constant.

The semiconductor light emitting device has such a property that an emission wavelength is changed due to a variation in a junction temperature which is caused by a change in a driving current or an environmental temperature. For this reason, there is a problem in that a chromaticity is changed due to the variation in the junction temperature even if the driving current is set to be constant so as to hold the rate of the light quantities to be constant.

Against the problem, International Publication WO2011/086682 discloses a technique for adjusting a cooling capacity of each light source to limit a rate of light quantities of respective light sources into a certain range even if a junction temperature is varied, thereby maintaining white balance. If a driving current is changed to regulate the light quantity, an emission wavelength is also varied. For this reason, the driving current is fixed to control the cooling capacity.

Moreover, Japanese Patent No. 4525767 proposes that a junction temperature is calculated from an ambient temperature of an LED and a target light quantity with which the white balance is maintained is calculated from a difference between the junction temperature and a reference temperature.

Both the International Publication WO2011/086682 and the Japanese Patent No. 4525767 have an object to maintain the white balance (the rate of the quantities of the light having the respective colors) and do not prevent the change in the emission wavelength of each light emitting device which is caused by the variation in the temperature. Further, in the International Publication WO2011/086682, the driving current is fixed. For this reason, even if the rate of the light quantities can be maintained, it is impossible to regulate a light output value to have an optional constant value.

SUMMARY OF THE INVENTION

It is an object of the present invention to provide a lighting apparatus using a plurality of semiconductor light emitting devices, thereby enabling maintenance of an emission wavelength and a light quantity of each of the semiconductor light emitting devices to have desirable constant values.

A semiconductor lighting apparatus according to the present invention includes a plurality of semiconductor light emitting devices, a synthesizing portion, an optical sensor, a current control portion, a temperature sensor, a temperature regulating portion and a calculating portion. The plurality of semiconductor light emitting devices output light having different colors from each other. The synthesizing portion synthesizes output light of the plurality of semiconductor light emitting devices and outputs synthesized light. The optical sensor detects an output light quantity of each of the semiconductor light emitting devices. The current control portion supplies a driving current to each of the semiconductor light emitting devices. The temperature sensor detects an ambient temperature of each of the semiconductor light emitting devices. The temperature regulating portion cools each of the semiconductor light emitting devices. The calculating portion receives outputs of the optical sensor and the temperature sensor and previously prepared data to control the driving current to be supplied by the current control portion in such a manner that a light quantity detected by the optical sensor approximates to a predetermined target light quantity, and calculates a target temperature of the semiconductor light emitting device to control the temperature regulating portion in such a manner that a temperature detected by the temperature sensor approximates to the target temperature.

A luminance of each of the semiconductor light emitting devices is maintained to be constant by the regulation of the driving current, and an emission wavelength of each of the semiconductor light emitting devices is held to have a desirable constant value by the regulation of the temperature.

These and other objects, features, aspects and advantages of the present invention will become more apparent from the following detailed description of the present invention when taken in conjunction with the accompanying drawings.

DESCRIPTION OF THE PREFERRED EMBODIMENTS

A. First Preferred Embodiment

<A-1. Structure>

Figure 1:
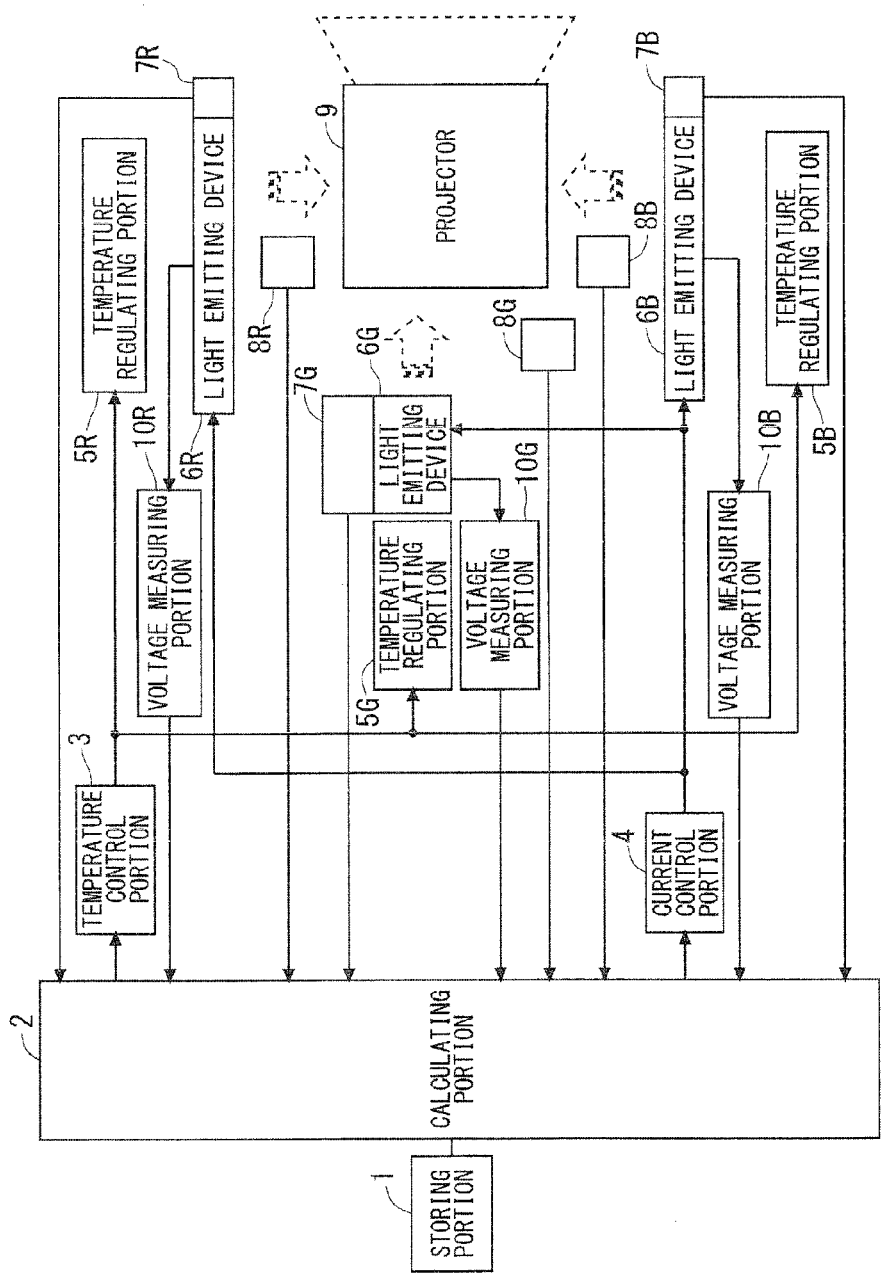
FIG. 1 is a diagram showing a structure of a lighting apparatus according to the present invention.

FIG. 1 is a diagram showing a structure of a semiconductor lighting apparatus 100 according to a first preferred embodiment. The semiconductor lighting apparatus 100 includes a storing portion 1, a calculating portion 2, a temperature control portion 3, a current control portion 4, temperature regulating portions 5R, 5G, and 5B, light emitting devices 6R, 6G, and 6B, temperature sensors 7R, 7G, and 7B, optical sensors 8R, 8G, and 8B, and a projector 9.

The light emitting devices 6R, 6G, and 6B are semiconductor light emitting devices such as semiconductor lasers (LDs) or light emitting diodes (LEDs) which output red light, green light, and blue light respectively. Output light of the light emitting devices 6R, 6G, and 6B are synthesized into white light by means of the projector 9. The projector 9 further modulates the white light every pixel to create an image, and then projects the image onto a projection surface. In other words, the projector 9 has functions of a synthesizing portion, a light modulating portion and a projecting portion.

The temperature sensors 7R, 7G, and 7B and the optical sensors 8R, 8G, and 8B are provided around the light emitting devices 6R, 6G, and 6B, respectively. The temperature sensors 7R, 7G, and 7B serve to measure an ambient temperature Tth of the light emitting devices 6R, 6G, and 6B. The optical sensors 8R, 8G, and 8B serve to receive a part of the output light of the light emitting devices 6R, 6G, and 6B, thereby measuring a light quantity. In addition, the temperature regulating portions 5R, 5G, and 5B for cooling the light emitting devices 6R, 6G, and 6B are provided around the light emitting devices 6R, 6G, and 6B, respectively. The temperature regulating portions 5R, 5G, and 5B are, for example, fans, Peltier devices and the like, and their cooling capacities are controlled by the temperature control portion 3. Moreover, a driving current of the light emitting devices 6R, 6G, and 6B are regulated by the current control portion 4.

The calculating portion 2 acquires the ambient temperature of the light emitting devices 6R, 6G, and 6B from the temperature sensors 7R, 7G, and 7B and outputs a temperature control signal to the temperature regulating portions 5R, 5G, and 5B in order to cause the ambient temperature to approximate to a target temperature. Moreover, the calculating portion 2 acquires output light quantities of the light emitting devices 6R, 6G, and 6B from the optical sensors 8R, 8G, and 8B and outputs a current control signal to the current control portion 4 in order to cause the output light quantities to approximate to a target light quantity.

The storing portion 1 records necessary data for variously carrying out setting and regulation through the calculating portion 2 in order to perform a function of a light source.

<A-2. Operation>

Figure 2:
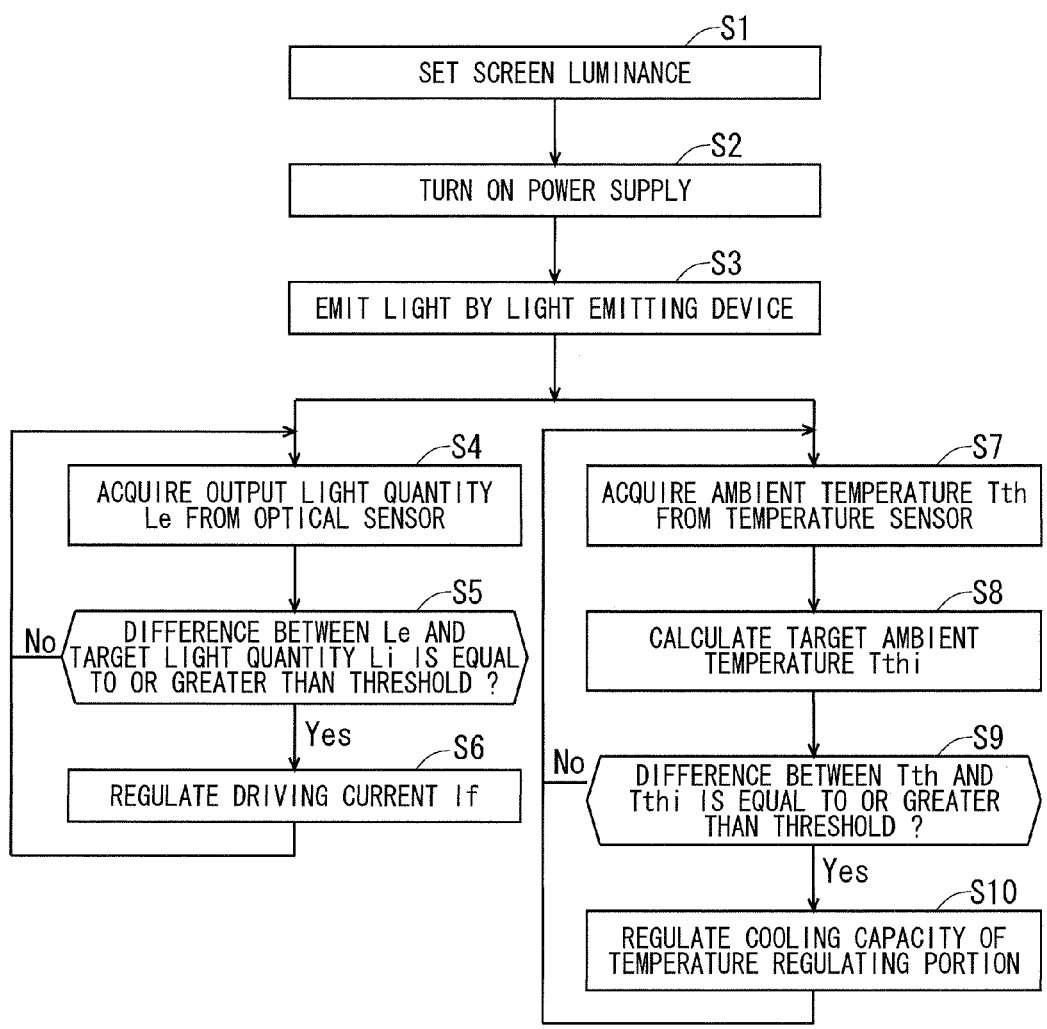
FIG. 2 is a flow chart showing an operation of the lighting apparatus according to the present invention.

Referring to a semiconductor light emitting device, a junction temperature is changed when a driving current or an environmental temperature is varied, and a luminance and a wavelength of output light is consequently changed. Therefore, in the semiconductor lighting apparatus 100, the junction temperatures of the light emitting devices 6R, 6G, and 6B are maintained to be constant so that luminances and wavelengths of the output light of the light emitting devices 6R, 6G, and 6B are held to be constant. As a result, a luminance and a chromaticity of white light obtained by synthesizing light having respective colors are also maintained to be constant. An operation for controlling the luminance and the wavelength which will be described with reference to a flow chart of FIG. 2 is carried out for each of the light emitting devices 6R, 6G, and 6B. However, for simplicity of the description, the control operation for the light emitting device 6R will be described typically.

First of all, a screen luminance to be a target of a user is set (Step S1). An optional value can be set to the screen luminance and the set value is stored in the storing portion 1.

Subsequently, when the user turns ON the semiconductor lighting apparatus 100 (Step S2), a driving current is supplied by the current control portion 4 so that the light emitting devices 6R, 6G, and 6B emit light (Step S3).

The light emitting device 6R will be described. Next, the calculating portion 2 acquires an output light quantity Le of the light emitting device 6R from the optical sensor 8R (Step S4). The calculating portion 2 calculates a target light quantity Li of the light emitting device 6R for implementing the screen luminance set at the Step S1 and compares Li with Le (Step S5). If a difference between Le and Li is equal to or greater than a threshold, a driving current If is regulated in such a direction that Le approximates to Li (Step S6). More specifically, If is increased when Le is smaller than Li, and If is decreased when Le is greater than Li. When If is completely regulated, the process returns to Step S4 and Le is acquired again. In a case where the difference between Le and Li is smaller than the threshold in Step S5, If is not regulated but the process returns to Step S4. The operation for controlling the driving current If in the calculating portion 2 as described above is repetitively carried out during the light emission of the light emitting device 6R. As described above, the calculating portion 2 regulates the driving current If. More specifically, the current control portion 4 changes the driving current If based on the current control signal sent from the calculating portion 2, thereby carrying out the regulation.

Simultaneously with the control of the driving current (Steps S4 to S6), the calculating portion 2 also controls the temperature. In the temperature control, the calculating portion 2 first acquires the ambient temperature Tth of the light emitting device 6R from the temperature sensor 7R (Step S7). Next, a target ambient temperature Tthi of the light emitting device 6R is calculated (Step S8). An equation for calculating the target ambient temperature Tthi will be described below.

First of all, a junction temperature Tj of the light emitting device 6R is expressed in the following equation.

[Equation 1]

$$Tj = Tth + \theta jth \times Q \tag{1}$$

wherein θjth represents a thermal resistance between a measuring place for the ambient temperature Tth and a junction. Moreover, Q represents a quantity of heat generated in the light emitting device 6R and is expressed in the following equation.

[Equation 2]

$$Q = Vf \times If - Po \tag{2}$$

wherein Vf represents a voltage between terminals, If represents a driving current, and Po represents a quantity of heat of output light. In other words, any of quantities of heat which is generated in the light emitting device 6R and is obtained by subtracting a heat quantity of light applied onto an outside portion is stored in the light emitting device 6R as the quantity of heat Q.

The target ambient temperature Tthi is expressed in the following equation based on the Equations (1) and (2).

[Equation 3]

$$Tthi = Tji - \theta jth \times (Vf \times If - Po) \tag{3}$$

In the equation, Tji represents a target junction temperature of the light emitting device 6R which has an optimum value in respect of a design. Although the thermal resistance θjth and the voltage between terminals Vf have actual measured values, they have a very small individual difference. For this reason, it is also possible to use a fixed value which is previously stored in the storing portion 1. In a case where control is carried out with higher precision, an actual measured value which is measured individually in a manufacturing stage may be stored in the storing portion 1.

Alternatively, referring to Vf, a portion, 10R, 10G, 10B, for measuring a voltage between terminals may be provided in the semiconductor lighting apparatus 100 and a measured value thereof may be used. In this case, it is possible to set the target temperature Tthi in consideration of a change in Vf which is caused by aging degradation. If represents a driving current for implementing the target light quantity Li which has a value to be regulated at any time in Step S6 which is executed simultaneously with the temperature control. A heat quantity Po of output light is determined corresponding to the target light quantity Li. From the foregoing, the calculating portion 2 calculates the target ambient temperature Tthi by using the Equation (3).

Next, the calculating portion 2 compares the ambient temperature Tth with the target ambient temperature Tthi (Step S9). In a case where the difference is smaller than a threshold, the cooling capacity of the temperature regulating portion 5R is regulated in such a manner that Tth approximates to Tthi. The cooling capacity is increased if Tth is greater than Tthi, and the cooling capacity is reduced if Tth is smaller than Tthi. Herein, the temperature control portion 3 changes the cooling capacity of the temperature regulating portion 5R based on a temperature control signal sent from the calculating portion 2. The temperature control in the calculating portion 2 described above is repetitively carried out during light emission of the light emitting device 6R simultaneously with current control.

Although the current control and the temperature control for the light emitting device 6R have been described above, the current control and the temperature control are carried out for the light emitting devices 6B and 6G simultaneously with the light emitting device 6R. Thus, the light quantities of the respective light emitting devices 6R, 6B and 6G are regulated to be the target light quantity and the chromaticity is maintained to be constant. Accordingly, it is possible to maintain constant white balance of the white light obtained by synthesizing the respective output light through the projector 9 and to regulate the luminance optionally.

<A-3. Effect>

The semiconductor lighting apparatus 100 includes the plurality of light emitting devices 6R, 6G, and 6B (the semiconductor light emitting devices) for outputting light having different colors from each other, the projector 9 (the synthesizing portion) for synthesizing the output light of the light emitting devices 6R, 6G, and 6B and outputting synthesized light, the optical sensors 8R, 8G, and 8B for detecting the output light quantity Le of each of the light emitting devices 6R, 6G, and 6B, the current control portion 4 for supplying the driving current If to each of the light emitting devices 6R, 6G, and 6B, the temperature sensors 7R, 7G, and 7B for detecting the ambient temperature Tth of the light emitting devices 6R, 6G, and 6B, the temperature regulating portions 5R, 5G, and 5B for cooling each of the light emitting devices 6R, 6G, and 6B, and the calculating portion 2 for receiving the outputs of the optical sensors 8R, 8G, and 8B and the temperature sensors 7R, 7G, and 7B and the previously prepared data to control the driving current If to be supplied by the current control portion 4 in such a manner that the light quantity Le detected by the optical sensors 8R, 8G, and 8B approximates to the predetermined target light quantity Li and calculating the target temperature Tthi of the light emitting devices 6R, 6G, and 6B to control the temperature regulating portions 5R, 5G, and 5B in such a manner that the temperature Tth detected by the temperature sensors 7R, 7G, and 7B approximates to the target temperature Tthi. By the structure described above, the control of the driving current If and that of the temperature regulating portions 5R, 5G, and 5B are carried out. Consequently, it is possible to optionally regulate the light quantity and wavelength of the output light for every light emitting device 6R, 6G, and 6B.

Moreover, the calculating portion 2 calculates, as the target temperature Tthi, the ambient temperature Tth in a case where the junction temperature Tj of the light emitting devices 6R, 6G, and 6B has a predetermined value in accordance with the arithmetic expression using the driving current If as a parameter. Accordingly, also in a case where the driving current If fluctuates to regulate the light quantity, the target temperature Tthi is determined in consideration of the fluctuation in the driving current If. Therefore, the emission wavelength is maintained to be constant.

Moreover, the target light quantity Li has a value corresponding to a luminance which can be set optionally from outside. Therefore, the light quantity of the output light is regulated in accordance with the luminance set optionally by a user. Also in that case, the emission wavelength is held to be constant.

Furthermore, the semiconductor lighting apparatus 100 may include a voltage measuring portion for measuring the voltage between terminals Vf of the light emitting devices 6R, 6G, and 6B. The calculating portion 2 calculates the target temperature Tthi in accordance with the arithmetic expression using the voltage between terminals Vf as the parameter. Therefore, it is possible to correct an influence, on the junction temperature, of a drop in a voltage between terminals which is caused by aging degradation of the device.

In the present invention, the preferred embodiments can be properly changed and omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A semiconductor lighting apparatus comprising:
    a plurality of semiconductor light emitting devices for outputting light having different colors from each other;
    a synthesizing portion for synthesizing output light of said plurality of semiconductor light emitting devices and outputting synthesized light;
    an optical sensor for detecting a light quantity of an output of each of said semiconductor light emitting devices;
    a current control portion for supplying a driving current to each of said semiconductor light emitting devices;
    a temperature sensor for detecting an ambient temperature of each of said semiconductor light emitting devices;
    a temperature regulating portion for cooling each of said semiconductor light emitting devices; and
    a calculating portion that receives outputs of said optical sensor and said temperature sensor and previously prepared data to control said driving current to be supplied by said current control portion in such a manner that a light quantity detected by said optical sensor approximates to a predetermined target light quantity, and that calculates a target temperature of said semiconductor light emitting device to control said temperature regulating portion in such a manner that a temperature detected by said temperature sensor approximates to said target temperature.

2. The semiconductor lighting apparatus according to claim 1, wherein said calculating portion calculates, as said target temperature, said ambient temperature in a case where a junction temperature of said semiconductor light emitting device has a predetermined value in accordance with an arithmetic expression using said driving current as a parameter.

3. The semiconductor lighting apparatus according to claim 2, wherein said target light quantity has a value corresponding to a luminance which can be set optionally from outside.

4. The semiconductor lighting apparatus according to claim 2, further comprising a voltage measuring portion for measuring a voltage between terminals of said light emitting device,
    said calculating portion calculating said target temperature in accordance with an arithmetic expression using said voltage between terminals as a parameter.

* * * * *